D. McARTHUR.
PNEUMATIC TIRE.
APPLICATION FILED APR. 15, 1908.
924,812.
Patented June 15, 1909.
2 SHEETS—SHEET 1.
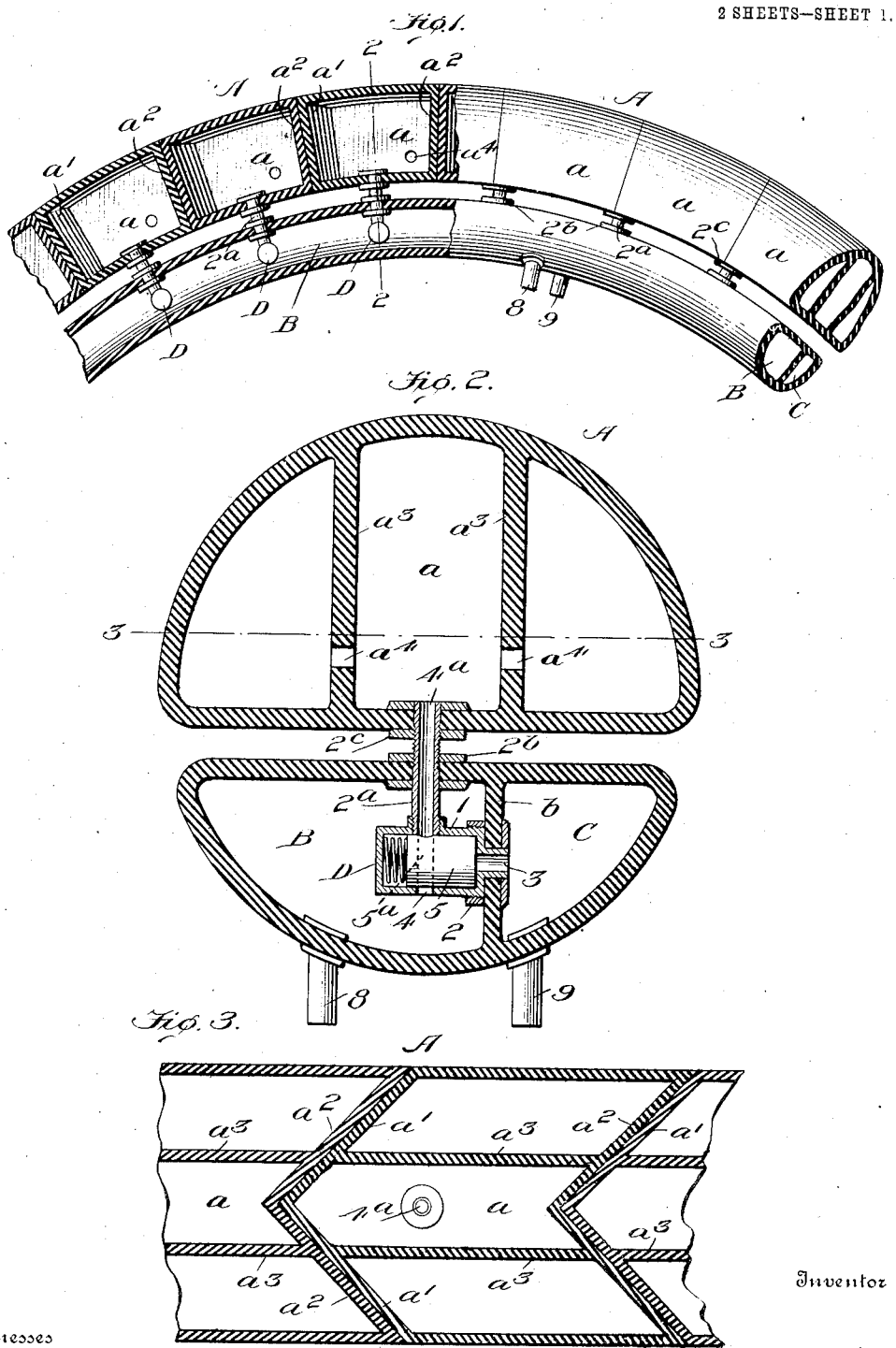
Witnesses
Edwin L. Bradford
Inventor
Daniel McArthur
By F. W. Ritter, Jr.
Attorney

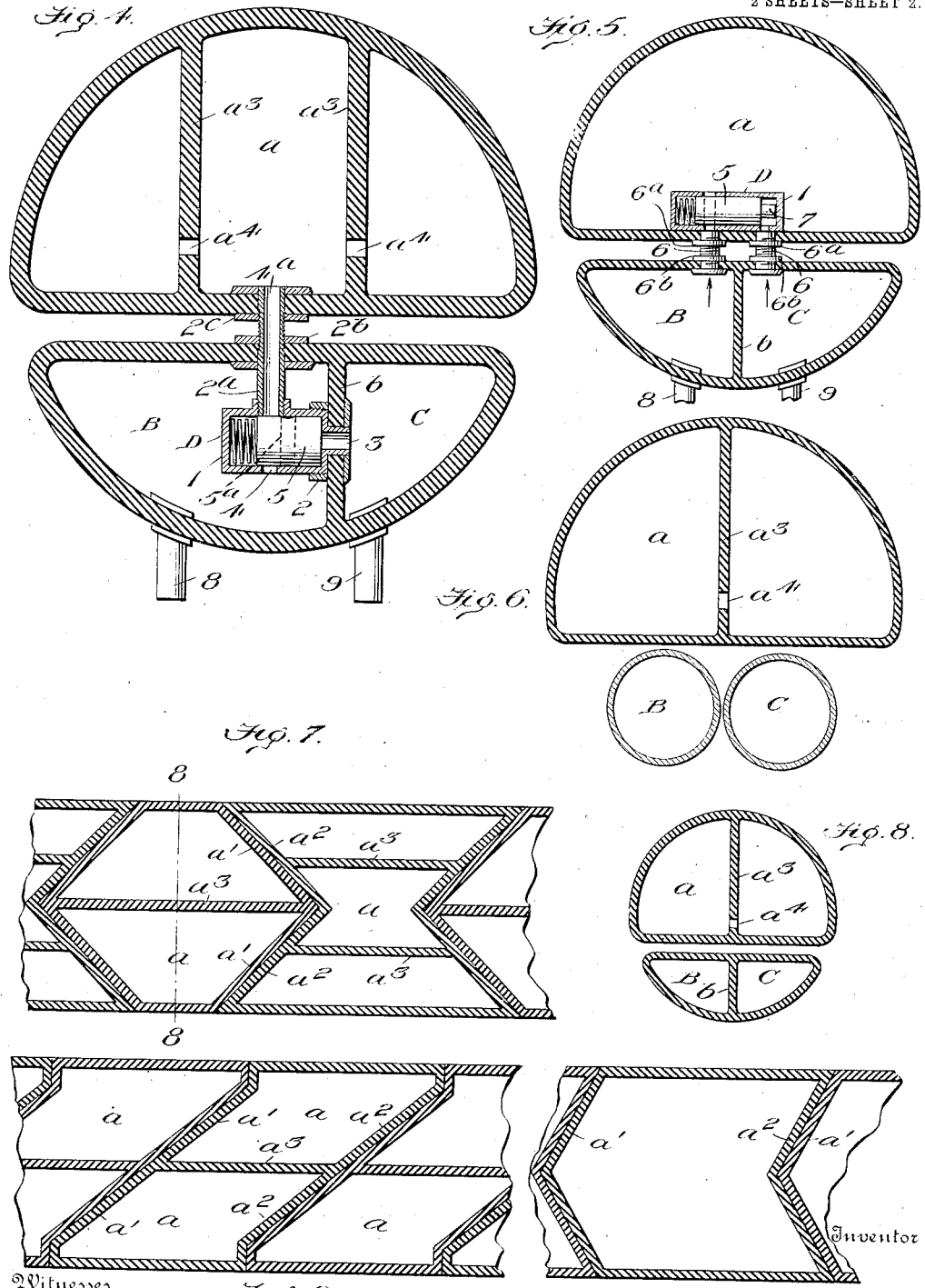

UNITED STATES PATENT OFFICE.

DANIEL McARTHUR, OF JERSEY CITY, NEW JERSEY.

PNEUMATIC TIRE.

No. 924,812.          Specification of Letters Patent.      Patented June 15, 1909.

Application filed April 15, 1908. Serial No. 427,202.

*To all whom it may concern:*

Be it known that I, DANIEL McARTHUR, a citizen of the United States, residing at Jersey City, in the county of Hudson and State of New Jersey, have invented certain new and useful Improvements in Pneumatic Tires; and I do hereby declare the following to be a full, clear, and exact description of the invention, such as will enable others skilled in the art to which it appertains to make and use the same.

My invention relates to the construction of pneumatic tires for automobiles, motorcycles, and the like, and especially to that class of pneumatic tires wherein are combined a series of independent pockets, chambers, or sections, to produce what may be termed a non-collapsible tire, inasmuch as a puncture will bleed but a single pocket or chamber, thus but slightly reducing the resiliency and effectiveness of the tire.

Heretofore, so far as I am aware, in automobile and like pneumatic tires composed of a series of independent pockets or chambers the valves employed between the independent pockets and the inflation conduit have been such as to permit the bleeding of the inflation conduit on the puncturing of any one of said independent pockets or chambers; or else it has been of the plug valve type which required the independent manipulation of each valve at the time of the inflation of the pockets in order to isolate the individual pocket.

The object of the present invention is to obtain a construction wherein the individual pockets or chambers of the tire will be so isolated that a puncture of one will in nowise affect the pressure in any of the remaining chambers or in the inflation conduit, and also such a construction that the series of valves controlling the induction ports of the several independent pockets may be simultaneously operated either to isolate the several pockets or to establish communication between the several pockets and the inflation and deflation conduit, as conditions may require.

A further object of my invention is to obtain such a construction of the independent pocket, or section, that when the same is punctured a maximum of rigidity will exist in the punctured pocket to maintain the efficiency of the tire notwithstanding the deflation of one or more of said pockets or chambers.

To effect these several objects I combine with a pneumatic tire having an air pocket, and an inflation conduit, an air-conduit, and a valve interposed between the air-pocket and the inflation conduit said valve adapted to be opened and closed by the variation of pressure in said air-conduit, and such a construction embodies the main feature of my invention. I also form the independent air pockets with telescoping ends the walls of said ends being obliquely disposed with relation to the circumference of the tire when said pockets or sections are associated to constitute a tire, and such a construction embodies a further feature of my invention.

There are other, minor features of invention, involving special features of construction, and particular combinations, ancillary to the main combinations of my invention, all as will hereinafter more fully appear.

In the drawings chosen for the purpose of illustrating my invention, the scope of which is pointed out in the claims, Figure 1 is an elevation, partly in section, of a portion of a pneumatic tire embodying my invention. Fig. 2 is an enlarged transverse section of the tire, on the line 2—2 Fig. 1 showing the valve normally open. Fig. 3 is a horizontal section of the independent pockets, on the line 3—3 Fig. 2. Fig. 4 is a transverse section of the tire, similar to Fig. 2, except that the valve is normally closed. Fig. 5 is a transverse section of the tire, similar to Figs. 2 and 4, except that the valve is located in the pocket instead of in the inflation conduit. Fig. 6 is a transverse section of a tire in which the inflation conduit and the air conduit are shown as independent tubes, instead of joined as in the other figures of the drawings. Fig. 7 is a horizontal section of a modification of the cell pocket shown in Fig. 3. Fig. 8 is a transverse section of a tire on the line 8—8 Fig. 7. Figs. 9 and 10 are horizontal sections of other modifications of the cell pocket constituting the tire.

Like symbols refer to like parts wherever they occur.

I will now proceed to describe my invention more fully so that others skilled in the art to which it appertains may apply the same.

The structure generally considered involves an outer or tread member A which is made up of a series of independent telescoping pockets *a*, *a*, and two inner sections or annular conduits, one of which, B, is the inflation conduit, and also serves for deflation when required, and the other of which, C, is a simple air conduit the varying pressure therein being used to shift the valves D which control the inlet ports of the independent pockets $a$, $a$.

The independent pockets $a$, $a$, a series of which constitute the outer section A or circumference of the tire, are provided with telescoping or interlocking end walls $a'$, $a^2$ on lines oblique to the circumference of the tire, and as additional means of stiffening the pocket when deflated, it is provided with one or more partitions or inner walls $a^3$ integral with the outer walls of the pocket and either in the plane of the tread of the tire or parallel thereto, said walls being perforated as at $a^4$ so that the interior of the pocket $a$ is divided up into a series of communicating cells.

The inflation-conduit B and the air-conduit C may be separate annular tubes as indicated in Fig. 6 of the drawing, but preferably are formed as a single construction with an integral partition $b$ which separates the same into two annular conduits, the inflation-conduit B being the larger of the two when the valves are located therein.

D, D indicate the valves, one of which is employed with each independent pocket $a$ of the section A forming the tread, and said valve may be located either in the pocket $a$, or in the inflation conduit B as may be preferred.

The valve D may be of any desired type which can be shifted by pneumatic pressure, as for instance either piston or slide and with either cross-over or through ports, but preferably is one of the two forms of piston valves shown in the drawings.

The valves as illustrated, consist of a cylinder or casing 1, which, if located in the inflation-conduit B, is secured to the partition $b$ by a flange and a nut 2, or in other suitable manner and is provided with a port 3 whereby the casing 1 communicates with the air-conduit C. From the casing 1 a port or passage $4^a$ leads to the interior of the independent pocket $a$ which it is designed to inflate through said valve, and said passage may be constituted of a threaded tube $2^a$ provided with nuts or clamp flanges $2^b$, $2^c$ whereby connection is made with the walls of the inflation-conduit B and the walls of the pocket $a$.

Opposite to the port or passage $4^a$ the casing or cylinder 1 is provided with a port 4 leading into inflation conduit B. Within the cylinder or casing 1 is a spring pressed piston valve 5 provided with a through port or passage $5^a$, and the location of this passage or port $5^a$ of the piston valve 5 will determine whether the valve D shall stand normally open for inflation and be closed by the pneumatic pressure in air-conduit C, as illustrated in Fig. 2 of the drawing, or whether it shall stand normally closed and be opened for inflation by pneumatic pressure in air-conduit C.

When it is preferred to locate the valve D in the individual pocket $a$, as indicated in Fig. 5 of the drawing, the casing 1 is connected with the walls of the chamber $a$ and the walls of conduits B and C, in like manner as before noted, viz., by threaded tubes 6, which constitute the valve ports leading from the inflation-conduit B and the air-conduit C to the casing, and by clamp flanges or nuts $6^a$, $6^b$.

In Fig. 5 of the drawings the arrangement of the valve ports is shown for the valve normally open, and the piston is provided with a limit stop 7, so that the valve will be closed by pneumatic pressure in air conduit C, but, as hereinbefore noted, if preferred, the arrangement of valve ports may be such that the valve will be normally closed, and will be opened by the pneumatic pressure in air conduit C.

The inflation-conduit B and the air-conduit C are each provided with its charging valve 8 and 9 projecting through the felly of the wheel for charging said conduits from a suitable air compressor.

Though, in the drawings chosen for the purpose of illustrating my invention I have shown only a portion of the inner tube of a tire, and have omitted entirely the outer tire section, yet it will be fully understood by those skilled in the art that the circle constituting the inner tube of the tire is to be completed or built up of separate removable compartments or pockets $a$ whose ends telescope, and that when inflated said compartments are inclosed by and rest upon the tread of the outer tire section as is the case with other multiple pocket tires.

The construction being such as hereinbefore pointed out the several separate or independent pockets $a$ $a$ constituting the outer section A of the tire may be simultaneously inflated and closed off from each other and from the inflation-conduit B as follows: If the valves D, D be normally open, as indicated in Fig. 2 of the drawing, the inflation-conduit B will be connected with an air compressor through charging valve 8, and the desired pressure (say sixty pounds) induced in conduit B will pass directly and simultaneously in to all of the independent pockets $a$, $a$, &c., through the respective open valves D, whereupon the air compressor will be disconnected from charging valve 8 of the inflation-conduit B, and said valve closed, and thereafter applied to charging valve 9 of air-conduit C until the pneumatic pressure in air-conduit C is sufficient to simultaneously shift all the valves D and cut off the air pockets $a$, $a$ from each other and from the inflation conduit B, after which, if desired, the pressure in conduit C may be raised to equal or exceed that in the pockets a, a and the inflation conduit B.

In order to deflate the tire, where the arrangement of the valve ports 5ª is such as shown in Fig. 2, it will be first necessary to bleed the air-conduit C. If, however, the valves D, D are normally closed, as shown in Fig. 4 of the drawings, the air compressor is first applied to the charging-valve 9 of the air-conduit C, and the pneumatic pressure in air-conduit C raised to the desired pressure, say sixty-five pounds, which will simultaneously shift the pistons of all of the valves D, D so as to open communication between the inflation-conduit B and the several pockets a, a, a, whereupon the air compressor will be disconnected from charging valve 9, which will be closed, and applied to charging valve 8, and the inflation-conduit B and the several pockets a, a, &c., will be charged to say sixty pounds pressure, after which the air compressor will be detached from valve 8, said valve closed, and valve 9 opened to bleed air-conduit C, say five pounds, whereupon the pistons 5 of the several valves D, D will be again simultaneously shifted to close the ports, cut off communication between inflation-conduit B and the several pockets a, a, a, &c., so that said pockets a, a, a will be isolated from each other and from the inflation conduit B.

In order to deflate where the arrangement of valve ports is such as shown in Fig. 4, it will be necessary to first raise the pneumatic pressure in air-conduit C, which will simultaneously shift all of valves D, D and reëstablish communication between the several pockets a, a and the inflation-conduit B which now acts as a deflation-conduit when the valve 8 is opened.

Having thus described my invention, what I claim and desire to secure by Letters Patent is:

1. In a pneumatic tire, the combination of a plurality of independent air chambers or pockets, an inflation-conduit common to all and communicating with each of said pockets, an independent valve for each of said pockets, and a second air-conduit which communicates with the independent valves so that variation of air pressure in the last named conduit will simultaneously shift the several valves.

2. In a pneumatic tire, a plurality of independent air-chambers or pockets, an independent movable valve for each of said pockets, said valves located in the inflation-pockets, an inflation-conduit common to all of said pockets and which communicates with each of said pockets through its respective valve, and a second-air-conduit so connected with the respective valves that the valves may be simultaneously shifted by varying the air pressure in the last named air-conduit.

3. In a pneumatic tire, the combination of a plurality of independent air-chambers or pockets, an independent spring-pressed movable valve for each of said pockets, said valve provided with a port, an inflation-conduit common to all and which communicates with each of said pockets through its respective valve, and a second air-conduit so connected with the respective valves that the valves may be simultaneously shifted by varying the air pressure in said last named conduit.

4. In a pneumatic tire, the combination of a plurality of independent air-chambers or pockets, an independent spring-pressed piston valve for each of said pockets, said valve provided with a through port and having a suitable casing, an inflation-conduit common to all and which communicates with each of said pockets through its respective valve, and a second air-conduit so connected with the casings of the respective valves that the valves may be simultaneously shifted by varying the pressure in said last named air-conduit.

5. The combination in a pneumatic tire, of a series of air-chambers or pockets, an inflation conduit common to all of said air-chambers or pockets, an air-conduit, and a series of spring-pressed valves interposed between the respective air chambers or pockets and the inflation-conduit and adapted to be simultaneously shifted by variation of pressure in the air-conduit.

6. In a pneumatic tire, the combination of a plurality of independent and separable telescoping air-pockets having end walls arranged in a plane oblique to the tread of the tire.

7. In a pneumatic tire, the combination of a plurality of independent and separable telescoping air-pockets having perforated partitions in the plane of the tire.

8. In a pneumatic tire, the combination of a plurality of independent and separable telescoping air-pockets having perforated partitions in the plane of the tire and end walls obliquely disposed with relation to the plane of the tire.

In testimony whereof I affix my signature, in presence of two subscribing witnesses.

DANIEL McARTHUR.

Witnesses:
C. H. CLARK,
JOSEPH CAMPBELL.